(12) United States Patent
Ok et al.

(10) Patent No.: US 11,635,377 B2
(45) Date of Patent: Apr. 25, 2023

(54) DEVICE FOR INSPECTING LARGE AREA HIGH SPEED OBJECT

(71) Applicant: KOREA FOOD RESEARCH INSTITUTE, Jeollabuk-do (KR)

(72) Inventors: Gyeong-Sik Ok, Osan-si (KR); Hee-Jun Shin, Seoul (KR); Sung-Wook Choi, Jeollabuk-do (KR)

(73) Assignee: KOREA FOOD RESEARCH INSTITUTE, Jeollabuk-do (KR)

( * ) Notice: Subject to any disclaimer, the term of this patent is extended or adjusted under 35 U.S.C. 154(b) by 244 days.

(21) Appl. No.: 16/759,374

(22) PCT Filed: Feb. 9, 2018

(86) PCT No.: PCT/KR2018/001767
§ 371 (c)(1),
(2) Date: Apr. 27, 2020

(87) PCT Pub. No.: WO2019/088370
PCT Pub. Date: May 9, 2019

(65) Prior Publication Data
US 2020/0292452 A1     Sep. 17, 2020

(30) Foreign Application Priority Data
Oct. 30, 2017  (KR) .......... 10-2017-0142486

(51) Int. Cl.
*G02B 26/12*     (2006.01)
*G01N 21/59*     (2006.01)

(52) U.S. Cl.
CPC ............. *G01N 21/59* (2013.01); *G02B 26/12* (2013.01); *G02B 26/124* (2013.01); *G02B 26/125* (2013.01); *G01N 2201/0636* (2013.01)

(58) Field of Classification Search
CPC .......... G02B 5/001; G02B 5/09; G02B 26/12; G02B 26/123; G02B 26/124; G02B 26/125; G02B 27/0927; G02B 27/0933
See application file for complete search history.

(56) References Cited

U.S. PATENT DOCUMENTS

2012/0218558 A1* 8/2012 Cenko ................. A61B 5/0066
356/450

FOREIGN PATENT DOCUMENTS

JP     06-074895 A     3/1994
JP     H0846713 A     2/1996
(Continued)

OTHER PUBLICATIONS

International Search Report Corresponding to PCT/KR2018/001767 dated Jul. 30, 2018.
(Continued)

*Primary Examiner* — Joseph P Martinez
(74) *Attorney, Agent, or Firm* — Finch & Maloney PLLC

(57) ABSTRACT

A high-speed device, for inspecting a large area of an object, which includes: a terahertz wave generation portion configured to generate a terahertz wave; a ring beam forming portion configured to form a ring beam by using the terahertz wave incident from the terahertz wave generation portion; a rotary mirror configured to reflect the ring beam formed by the ring beam forming portion while rotating to allow the ring beam to be incident on an inspection target object; and a detector configured to detect a ring beam generated from the inspection target object.

18 Claims, 11 Drawing Sheets

(56) References Cited

FOREIGN PATENT DOCUMENTS

| KR | 10-2014-0130250 | * | 11/2014 | ............. G01N 21/00 |
| KR | 10-2014-0130250 A | | 11/2014 | |
| KR | 10-2016-0002137 | * | 1/2016 | ............. G01B 11/00 |
| KR | 10-2016-0002137 A | | 1/2016 | |
| KR | 10-1593399 B1 | | 2/2016 | |
| KR | 10-2017-0049904 A | | 5/2017 | |

OTHER PUBLICATIONS

Written Opinion Corresponding to PCT/KR2018/001767 dated Jul. 30, 2018.
Korean Office Action Corresponding to 10-2017-0142486 dated Jan. 21, 2019.

* cited by examiner ic method. These methods each have both merits and demerits, but the image detection method using a continuous output light source has been more widely used in a field requiring a higher output, such as a transmission image.

DEVICE FOR INSPECTING LARGE AREA HIGH SPEED OBJECT

TECHNICAL FIELD

The present invention relates to an inspection apparatus for a high speed and a large area, which is capable of performing high speed inspection on a large area of an inspection target object with a non-destructive method by using a terahertz wave.

[National Research and Development Project Supporting Present Invention]
[Task No.] E0142100-04(E0142105-04)
[Department Name] Ministry of Science and ICT
[Specialized Research Management Organization]
Korea Food Research Institute
[Research Project Title] Main Project of Korea Food Research Institute
[Research Task Title] Development of Terahertz High Resolution Imaging Technology for Detection of Foreign Matters in Food
[Contribution Ratio] 1/1
[Managing Organization] Korea Food Research Institute
[Research Term] Jan. 1, 2014 to Dec. 31, 2018

BACKGROUND ART

An imaging method is mainly used to inspect an object or substance in a non-destructive manner. The imaging method is primarily classified into two methods, an image detection method using a continuous output light source, and an image detection method using a spectroscopic method. These methods each have both merits and demerits, but the image detection method using a continuous output light source has been more widely used in a field requiring a higher output, such as a transmission image.

Terahertz waves have various excellent properties such as transmissivity with respect to substances, qualitative checking possibility, and safety for a living body, and thus have been widely used in a field of qualitatively checking for a hidden object or substance in a non-destructive manner.

Accordingly, terahertz waves have recently been used in various fields such as a search device in an airport or a security facility, a quality inspection device for a food company or a pharmaceutical company, a semiconductor inspection device, and an engineering plastic inspection device.

The use of terahertz waves in production sites has increased, and much improvement has been made by continuous research in terms of major performance indices such as detection resolution, a detection rate, and a detection area.

In the past, a method of mechanically moving a scan head equipped with a focusing optical system at a high speed or a method of performing optical scanning with a beam using a mirror was mainly used to inspect a large area. However, such a focusing optical system scanning method has a limitation in movement speed of the scan head, and the beam scanning method has a limitation in maximum scanning distance, which is problematic. Accordingly, the two methods may be combined as an alternative. However, a size of an optical aperture (numerical aperture) needs to be large to obtain a high resolution in the beam scanning method, and thus a size of the mirror needs to be large as well. In this case, a weight and a volume of the scan head become excessively large, such that it is difficult to operate the scan head capable of performing beam scanning, at a high speed.

The patent documents related to the present invention include Japanese Patent Laid-Open Publication No. 1994-175062 (Patent Document 1).

DISCLOSURE

Technical Problem

The present invention has been made in an effort to solve the problems in the related art and an object of the present invention is to provide an inspection apparatus for a high speed and a large area, which is capable of performing high speed inspection on a large area of an inspection target object with a high resolution, and includes an optical scan head with a small volume and weight.

Other objects and advantages of the present invention can be appreciated by the following description and will be clearly described by the embodiments of the present invention. Further, it will be easily appreciated that the objects and advantages of the present invention can be realized by means and a combination thereof recited in the appended claims.

Technical Solution

According to an embodiment of the present invention, an inspection apparatus for a high speed and a large area includes: a terahertz wave generation portion configured to generate a terahertz wave; a ring beam forming portion configured to form a ring beam by using the terahertz wave incident from the terahertz wave generation portion; a rotary mirror configured to reflect the ring beam formed by the ring beam forming portion while rotating to allow the ring beam to be focused on an inspection target object; and a detector configured to detect a ring beam generated from the inspection target object.

The ring beam forming portion includes: a first forming portion forming a terahertz Bessel beam by using the terahertz wave incident from the terahertz wave generation portion; and a second forming portion forming a ring beam by using the terahertz Bessel beam, and changing the ring beam so that the ring beam is incident on the rotary mirror while being parallel.

The first forming portion may be a first axicon lens having a vertex angle at which a diameter of the formed terahertz Bessel beam is smaller than a wavelength of the terahertz wave generated by the terahertz wave generation portion.

The second forming portion may be a second axicon lens disposed so as to be symmetric to the first axicon lens.

The second axicon lens may have the same vertex angle as the first axicon lens.

The second forming portion may be a first convex lens changing an angle of the terahertz Bessel beam incident from the first forming portion so that the terahertz Bessel beam is incident on the rotary mirror while being parallel.

The ring beam forming portion may include: a first axicon mirror forming a ring beam by reflecting the terahertz wave incident from the terahertz wave generation portion; and a second axicon mirror reflecting the ring beam reflected from the first axicon mirror toward the ring beam collecting portion.

The first axicon mirror may be disposed on a path of the terahertz wave incident from the terahertz wave generation portion.

The second axicon mirror may be disposed between the terahertz wave generation portion and the first axicon mirror, and have a first hole so that the terahertz wave incident from the terahertz wave generation portion passes and is incident on the first axicon mirror.

The second axicon mirror may have an inclined reflection surface corresponding to an outer surface of the first axicon mirror.

The second axicon mirror may have a reflection surface parallel to the outer surface of the first axicon mirror.

A size of the second axicon mirror may be larger than a size of the first axicon mirror.

The rotary mirror may be a polygon mirror having a plurality of reflection surfaces tilted at different angles, respectively, and rotating to change a path of the ring beam reflected by the plurality of reflection surfaces to form a first line beam on the inspection target object.

The high-speed device may further include a first moving portion configured to move a path of an optical scan head including the terahertz wave generation portion, the ring beam forming portion, the rotary mirror, and the detector to form a second line beam on the inspection target object, in a direction different from that of the first line beam.

The high-speed device may further include a second lens configured to allow the ring beam reflected by the rotary mirror to be focused on the inspection target object.

The high-speed device may further include a third lens configured to collect the ring beam reflected or transmitted from the inspection target object.

The high-speed device may further include an angle changing portion configured to decrease an angle of the terahertz wave incident from the terahertz wave generation portion to allow the terahertz wave to be incident on the ring beam forming portion.

The high-speed device may further include a second moving portion mechanically connected to the first axicon mirror and configured to move the first axicon mirror to change a focal point.

According to another embodiment of the present invention, an inspection apparatus for a high speed and a large area includes: a terahertz wave generation portion configured to generate a terahertz wave;

a ring beam forming portion configured to form a ring beam by using the terahertz wave incident from the terahertz wave generation portion; a polygon mirror having a plurality of reflection surfaces tilted at different angles, respectively, and configured to rotate to change a path of the ring beam reflected by the plurality of reflection surfaces to form a first line beam on an inspection target object; a first moving portion mechanically coupled to the polygon mirror and configured to move the polygon mirror to change the path of the ring beam reflected by the plurality of reflection surfaces to form a second line beam on the inspection target object, in a direction different from that of the first line beam; a second lens configured to allow the ring beam reflected by the polygon mirror to be focused on the inspection target object; a path changing portion disposed between the ring beam forming portion and the polygon mirror and configured to change a path of a reflection ring beam reflected from the inspection target object, incident on the polygon mirror, and reflected and incident from the polygon mirror; a third lens disposed so as to be spaced apart from the path changing portion and configured to collect the reflection ring beam of which the path is changed by the path changing portion; and a detector configured to detect the reflection ring beam collected by the third lens.

Advantageous Effects

With the inspection apparatus for a high speed and a large area according to the present invention using the ring beam, it is possible to increase a resolution, and decrease the diameter of the entire used beam due to the increased resolution, thereby reducing the size of the rotary mirror. As a result, it is possible to decrease the size and weight of the entire optical head.

Further, since the inspection apparatus for a high speed and a large area forms a line beam by using the rotary mirror, line scanning which uses a line beam to enable inspection on a specific line within a short time may be performed, rather than inspecting a specific point of the inspection target object. Therefore, the inspection apparatus for a high speed and a large area may rapidly inspect the inspection target object.

Since the inspection apparatus for a high speed and a large area forms a line beam on the inspection target object within a short time, line scanning may be performed. In addition, the line scanning may be performed by using the optical head capable of performing the line scanning, in a direction orthogonal to a line scanning direction, thereby obtaining a two-dimensional image and scanning a large area at a high speed.

Further, the inspection apparatus for a high speed and a large area inspects the object by adjusting the incident angle of the ring beam depending on a surface state of the inspection target object by using the second moving portion, and thus the ring beam may be incident at an optimized incident angle depending on the surface state of the inspection target object at the time of the inspection.

The inspection apparatus for a high speed and a large area may adjust the ring beam formed by the ring beam forming portion by using the second moving portion so that the resolution optimized for an inspection situation is obtained. Therefore, the inspection apparatus for a high speed and a large area may perform inspection optimized for each inspection situation.

DETAILED DESCRIPTION OF THE PREFERRED EMBODIMENT

Hereinafter, specific embodiments of the present invention will be described in detail with reference to the accompanying drawings.

Figure 1:
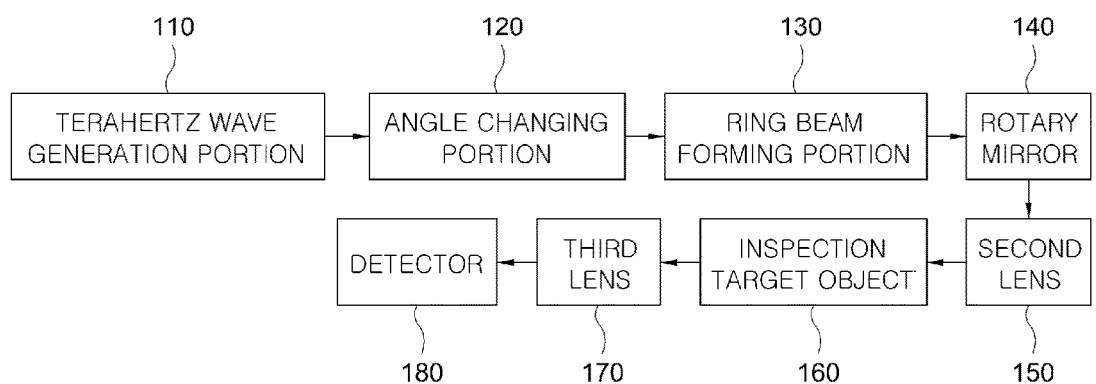
FIG. 1 is a diagram for describing an inspection apparatus for a high speed and a large area according to an embodiment of the present invention.

FIG. 1 is a diagram for describing an inspection apparatus for a high speed and a large area according to an embodiment of the present invention.

A high-speed device 100 for inspecting a large area of an object includes a terahertz wave generation portion 110, an angle changing portion 120, a ring beam forming portion 130, a rotary mirror 140, a second lens 150, an inspection target object 160, a third lens 170, and a detector 180.

The terahertz wave generation portion 110 may generate terahertz waves. The terahertz waves refer to electromagnetic waves within a terahertz range, and may preferably have a frequency of 0.1 THz to 10 THz. However, waves somewhat out of the above range may also be considered as the terahertz waves in the present invention as long as the waves are within a range that may be easily inferred by those skilled in the art to which the present invention pertains. For example, waves in a range such as a millimeter-wave range may also be considered as the terahertz waves. Further, although the case of using the terahertz wave generation portion 110 generating the terahertz waves is described in the present embodiment, it is a matter of course that an electromagnetic wave generation portion generating electromagnetic waves may be used.

The angle changing portion 120 may decrease an angle of a terahertz wave incident from the terahertz wave generation portion 110 to allow the terahertz wave to be incident on the ring beam forming portion 130. For example, the angle changing portion 120 may decrease the angle of the incident terahertz wave to a predetermined angle or less with respect to an optical axis or may cause the incident terahertz wave parallel to the optical axis. The angle changing portion 120 may be a convex lens that refracts the incident terahertz wave in parallel, a paraboloidal mirror that reflects the incident terahertz wave in parallel, or the like.

The ring beam forming portion 130 may form a ring beam by using the incident terahertz wave. A detailed description of the ring beam forming portion 130 will be provided later with reference to FIGS. 2 to 5.

The rotary mirror 140 may reflect the ring beam formed by the ring beam forming portion 130 while rotating to allow the ring beam to be incident on the second lens 150. For example, the rotary mirror 140 may have a plurality of reflection surfaces tilted at different angles, respectively, and may rotate to change a path of the ring beam reflected by the plurality of reflection surfaces to form a first line beam on the inspection target object. In this case, the line beam on the inspection target object is formed within a short time, thereby enabling a rapid inspection.

The second lens 150 may allow the ring beam reflected by the rotary mirror 140 to be focused on the inspection target object 160.

The third lens 170 may collect the ring beam reflected or transmitted from the inspection target object 160.

The detector 180 may detect the ring beam collected by the third lens 170.

An image generation portion (not illustrated) may generate an image by using the beam detected by the detector 180. The generated image may be displayed on a display (not illustrated).

Figure 2:
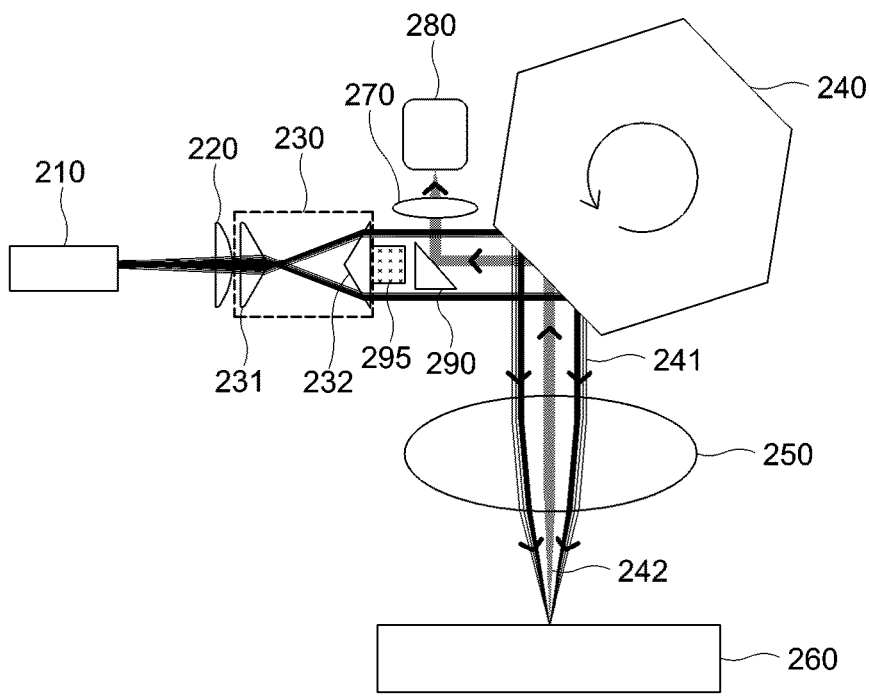
FIG. 2 is a diagram for describing a method of operating an inspection apparatus for a high speed and a large area according to an embodiment of the present invention.

FIG. 2 is a diagram for describing a method of operating the inspection apparatus for a high speed and a large area according to an embodiment of the present invention.

Referring to FIG. 2, a high-speed device 200 for inspecting a large area of an object includes a terahertz wave generation portion 210, an angle changing portion 220, a ring beam forming portion 230, a rotary mirror 240, a second lens 250, an inspection target object 260, a third lens 270, a detector 280, a path changing portion 290, and a second moving portion 295. In the present embodiment, a reflection-type object inspection device which inspects a ring beam reflected from the inspection target object 260 will be described.

The terahertz wave generation portion 210 may generate terahertz waves.

The angle changing portion 220 may decrease an angle of a terahertz wave incident from the terahertz wave generation portion 210 to allow the terahertz wave to be incident on the ring beam forming portion 230.

The ring beam forming portion 230 may form a ring beam by using the incident terahertz wave.

The ring beam forming portion 230 may include a first forming portion 231 and a second forming portion 232.

The first forming portion 231 may form a terahertz Bessel beam by using the terahertz wave incident from the terahertz wave generation portion 210.

The Bessel beam refers to an electromagnetic wave described by a zero-order Bessel function of the first kind, which is one solution set of the Maxwell's equation for a free space, and is known as a non-diffracting beam. The Bessel beam was first introduced by Durnin in 1987, and energy is concentrated in a predetermined length based on an axis in the shape of a needle while being axisymmetric. Since the Bessel beam is implemented by an optical system with a finite aperture, not an infinite aperture, there is no Bessel beam that propagates infinitely. Therefore, the Bessel beam is also referred to as a quasi-Bessel beam (QBB). Such a QBB may be formed by a hologram, a combination of a lens and a circular mask such as multiple rings, or finite apertures, or a conical lens known as an axicon.

Practically, it is difficult for the first forming portion 231 to form an ideal Bessel beam. Therefore, the Bessel beam formed by the first forming portion 231 may be the quasi-Bessel beam (QBB).

The first forming portion 231 may be implemented in various forms such as a diffractive optical element having multiple circular grooves or holes and a lens having a positive refractive index, an axicon lens, and a hologram optical element.

The first forming portion 231 may be a first axicon lens having an apical angle at which a diameter of the terahertz Bessel beam focused on the inspection target object is smaller than a wavelength of the terahertz wave generated by the terahertz wave generation portion. In the present embodiment, the apical angle at which the diameter of the terahertz Bessel beam is equal to or smaller than the wavelength is defined as a maximum apical angle.

In this case, a maximum value of the apical angle ($\tau$) of the first axicon lens may be calculated through the following Equations by using a diameter ($\rho_{FWHM}$) of a full width at half maximum of the terahertz Bessel beam focused on the inspection target object, a wavelength ($\lambda$), and refractive indices ($n$, $n_0$).

$$J_0(\kappa\rho\sin\alpha_0)^2 = J_0(1.1264)^2 = 0.5 \quad \text{[Equation 1]}$$

$$\rho_{FWHM} = \frac{1.1264}{\kappa\sin\alpha_0}$$

Here, $J_0(z)$ is the zero-order Bessel function of the first kind, $J_0(z)=1/\sqrt{2}$ needs to be satisfied in order to satisfy $J_0^2(z)=0.5$, and z satisfying this value is 1.1264. Accordingly, Equation 1 may be derived from Equation $1.1264 = k*\rho_{FWHM}*\sin\alpha_0$. In $J_0^2(z)=0.5$, the value 0.5 may be changed.

$$\alpha_0 = \arcsin\left(\frac{n}{n_0}\cos\left(\frac{\tau}{2}\right)\right) + \frac{\tau-\pi}{2}, \left(0 < \alpha_0 < \frac{\tau}{2}\right) \quad \text{[Equation 2]}$$

$$k = \frac{2\pi}{\lambda} \quad \text{[Equation 3]}$$

$$\rho_{FWHM} = \frac{1.1264}{\frac{2\pi}{\lambda}\sin\left[\arcsin\left(\frac{n}{n_0}\cos\left(\frac{\tau}{2}\right)\right) + \frac{\tau-\pi}{2}\right]} \quad \text{[Equation 4]}$$

Here, $J_0$: zero-order Bessel function $\rho_{FWHM}$: full width at half maximum of focused terahertz Bessel beam $\lambda$: wavelength of terahertz wave $\alpha_0$: half value of crossing angle of terahertz wave crossing after passing through axicon lens n: refractive index of first axicon lens $n_0$: average refractive index of surrounding environment $\tau$: apical angle of first axicon lens Equation 4 is an equation derived using Equation 1, Equation 2, and Equation 3.

Meanwhile, a minimum value of the apical angle of the first axicon lens may be a value at which total reflection according to the refractive index of the first axicon lens does not occur.

Therefore, the apical angle of the first axicon lens at which the diameter of the terahertz Bessel beam is smaller than the wavelength of the terahertz wave generated by the terahertz wave generation portion may be between the maximum value and the minimum value as described above.

The second forming portion 232 may form a ring beam by using the terahertz Bessel beam, and change an angle of the ring beam so that the ring beam is incident on the rotary mirror 240 while being parallel. For example, the second forming portion 232 may be a second axicon lens disposed so as to be symmetric to the first axicon lens. Here, the second axicon lens may have the same apical angle as the first axicon lens.

The rotary mirror 240 may reflect the ring beam 241 formed by the ring beam forming portion 230 while rotating to allow the ring beam to be incident on the second lens 250.

The second lens 250 may allow the ring beam 241 reflected by the rotary mirror 240 to be incident on the inspection target object 260.

A ring beam 242 reflected from the inspection target object 260 is incident on the rotary mirror 240, and the path changing portion 290 may change a path of a reflection ring beam reflected and incident from the rotary mirror 240. For example, the path changing portion 290 may change the path so that the ring beam incident from the rotary mirror 240 is incident on the third lens 270.

The second moving portion 295 may be mechanically connected to the second forming portion 232 and move the second forming portion 232 to change a focal point. For example, the second moving portion 295 may be implemented by a voice coil motor or the like.

The second moving portion 295 may move the second forming portion 232 to change a focal point of the ring beam. Therefore, it is possible to adjust the focal point depending on an inspection situation to result in the best results.

The third lens 270 may collect the ring beam 242 incident from the path changing portion 290 and allow the ring beam 242 to be incident on the detector 280.

The detector 280 may detect the ring beam collected by the third lens 270.

With the inspection apparatus for a high speed and a large area according to the present invention using the ring beam, it is possible to increase a resolution, and decrease the diameter of the entire beam due to the increased resolution, thereby reducing the size of the used rotary mirror. As a result, it is possible to decrease the size and weight of the entire optical scan head.

Further, since the inspection apparatus for a high speed and a large area forms a line beam by using the rotary mirror, line scanning which uses a line beam to enable inspection on a specific line within a short time may be performed, rather than inspecting a specific point of the inspection target object. Therefore, the inspection apparatus for a high speed and a large area may rapidly inspect the inspection target object.

Figure 3:
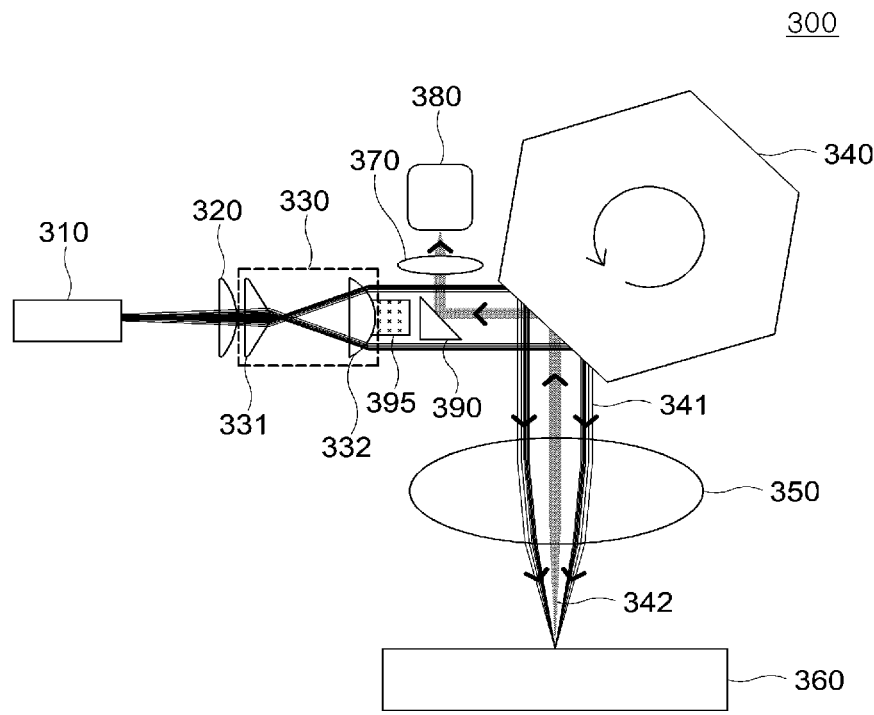
FIG. 3 is a diagram for describing a method of operating an inspection apparatus for a high speed and a large area according to another embodiment of the present invention.

FIG. 3 is a diagram for describing a method of operating an inspection apparatus for a high speed and a large area according to another embodiment of the present invention.

Referring to FIG. 3, a high-speed device 300 for inspecting a large area of an object includes a terahertz wave generation portion 310, an angle changing portion 320, a ring beam forming portion 330, a rotary mirror 340, a second lens 350, an inspection target object 360, a third lens 370, a detector 380, a path changing portion 390, and a second moving portion 395. In the present embodiment, a reflection-type object inspection device which inspects a ring beam reflected from the inspection target object 360 will be described.

Functions of the terahertz wave generation portion 310, the angle changing portion 320, the rotary mirror 340, the second lens 350, the inspection target object 360, the third lens 370, the detector 380, the path changing portion 390, and the second moving portion 395 are the same as those of FIG. 2, and thus a description of these components will be omitted below. Hereinafter, the ring beam forming portion 330 will be mainly described.

The ring beam forming portion 330 may form a ring beam by using the incident terahertz wave.

The ring beam forming portion 330 may include a first forming portion 331 and a second forming portion 332.

The first forming portion 331 may form a terahertz Bessel beam by using the terahertz wave incident from the terahertz wave generation portion 310.

The first forming portion 331 may be a first axicon lens having an apical angle at which a diameter of the terahertz Bessel beam focused on the inspection target object is smaller than a wavelength of the terahertz wave generated by the terahertz wave generation portion.

The second forming portion 332 may form a ring beam by using the terahertz Bessel beam, and change an angle of the ring beam so that the ring beam is incident on the rotary mirror 340 while being parallel. For example, the second forming portion 332 may be a first convex lens which changes the angle of the terahertz Bessel beam incident from the first forming portion 331 so that the terahertz Bessel beam is incident on the rotary mirror 340 while being parallel.

Figure 4:
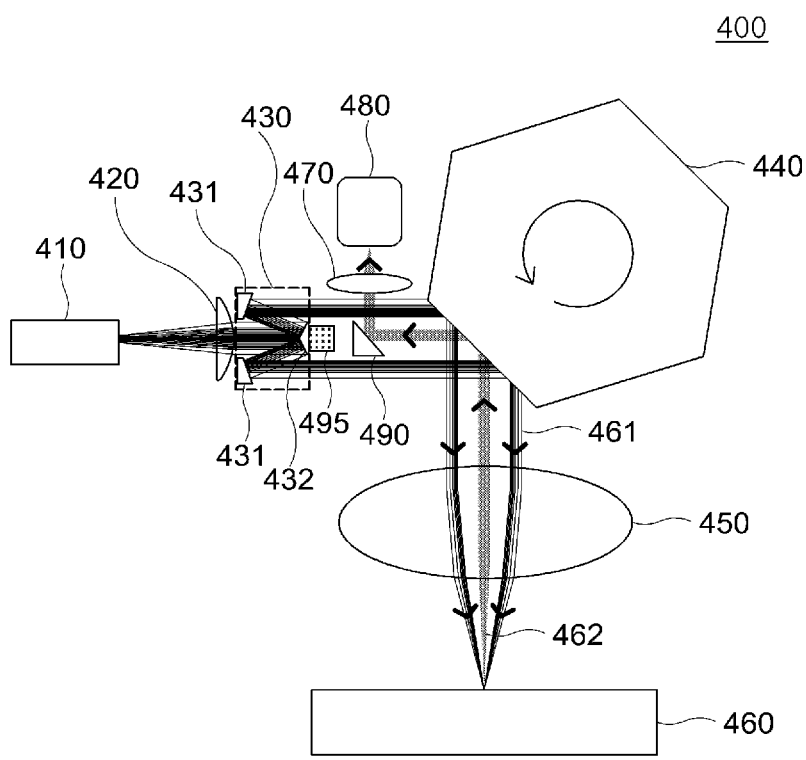
FIG. 4 is a diagram for describing a method of operating an inspection apparatus for a high speed and a large area according to another embodiment of the present invention.

FIG. 4 is a diagram for describing a method of operating an inspection apparatus for a high speed and a large area according to another embodiment of the present invention.

Referring to FIG. 4, a high-speed device 400 for inspecting a large area of an object includes a terahertz wave generation portion 410, an angle changing portion 420, a ring beam forming portion 430, a rotary mirror 440, a second lens 450, an inspection target object 460, a third lens 470, a detector 480, a path changing portion 490, and a second moving portion 495. In the present embodiment, a reflection-type object inspection device which inspects a ring beam reflected from the inspection target object 460 will be described.

Functions of the terahertz wave generation portion 410, the angle changing portion 420, the rotary mirror 440, the second lens 450, the inspection target object 460, the third lens 470, the detector 480, the path changing portion 490, and the second moving portion 495 are the same as those of FIG. 2, and thus a description of these components will be omitted below. Hereinafter, the ring beam forming portion 430 will be mainly described.

The ring beam forming portion 430 may form a ring beam by using the incident terahertz wave.

The ring beam forming portion 430 may include a first axicon mirror 432 and a second axicon mirror 431.

The first axicon mirror 432 is disposed on the path of the terahertz wave incident from the terahertz wave generation portion 410, and may be disposed between the second axicon mirror 431 and the rotary mirror 440.

The first axicon mirror 432 may form a ring beam by reflecting the terahertz wave incident from the terahertz wave generation portion 410 at an outer surface thereof.

The second axicon mirror 431 may be disposed between the terahertz wave generation portion 410 and the first axicon mirror 432.

The second axicon mirror 431 may reflect the ring beam reflected from the first axicon mirror 432 toward the rotary mirror 440. The ring beam reflected from the first axicon mirror 432 may be parallel to the terahertz wave incident from the terahertz wave generation portion 410.

The second axicon mirror 431 may have an inclined reflection surface corresponding to the outer surface of the first axicon mirror 432. For example, the second axicon mirror 431 may have a reflection surface parallel to the outer surface of the first axicon mirror 432.

The second axicon mirror 431 may have a first hole so that the terahertz wave incident from the terahertz wave generation portion 410 passes and is incident on the first axicon mirror 432. That is, the terahertz wave passes through the first hole and is incident on the first axicon mirror 432.

A size of the second axicon mirror 431 may be larger than a size of the first axicon mirror 432, and a size of the first hole of the second axicon mirror 431 may be smaller than a cross-sectional area of the first axicon mirror 432.

According to the present invention, as the ring beam is formed by using two axicon mirrors, the ring beam forming portion and the optical head may have small sizes.

Figure 5:
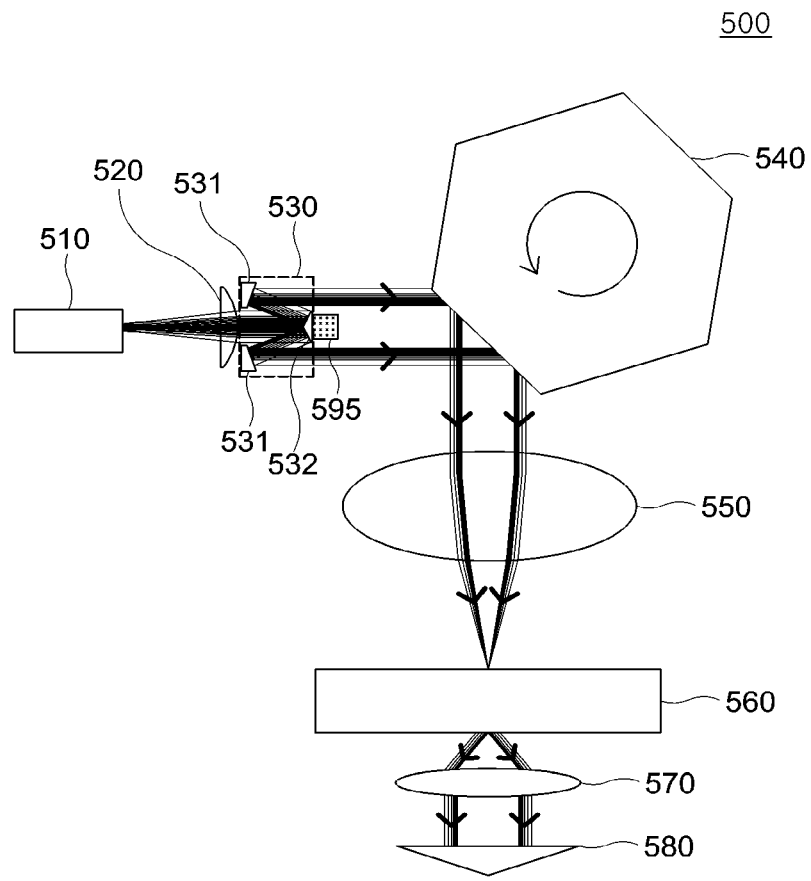
FIG. 5 is a diagram for describing a method of operating an inspection apparatus for a high speed and a large area according to another embodiment of the present invention.

FIG. 5 is a diagram for describing a method of operating an inspection apparatus for a high speed and a large area according to another embodiment of the present invention.

Referring to FIG. 5, a high-speed device 500 for inspecting a large area of an object includes a terahertz wave generation portion 510, an angle changing portion 520, a ring beam forming portion 530, a rotary mirror 540, a second lens 550, an inspection target object 560, a third lend 570, a detector 580, a path changing portion 590, and a second moving portion 595. In the present embodiment, a transmission-type object inspection device which inspects a ring beam transmitted from the inspection target object 560 will be described.

Functions of the terahertz wave generation portion 510, the angle changing portion 520, the ring beam forming portion 530, the rotary mirror 540, the second lens 550, the inspection target object 560, the third lens 570, the detector 580, the path changing portion 590, and the second moving portion 595 are the same as those of FIG. 4, and thus a description of these components will be omitted below. Hereinafter, a transmission-type detection technology will be mainly described.

The third lens 570 may collect, to the detector 580, the ring beam transmitted from the inspection target object 560.

The detector 580 may detect the ring beam collected by the third lens 570.

As such, the inspection apparatus for a high speed and a large area according to the present invention may also be implemented by the transmission-type detection method.

Figure 6:
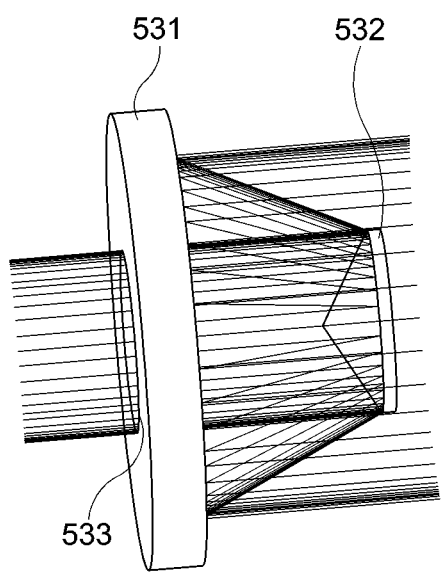
FIG. 6 is a diagram for specifically describing a ring beam forming portion of FIG. 5.
Figure 7:
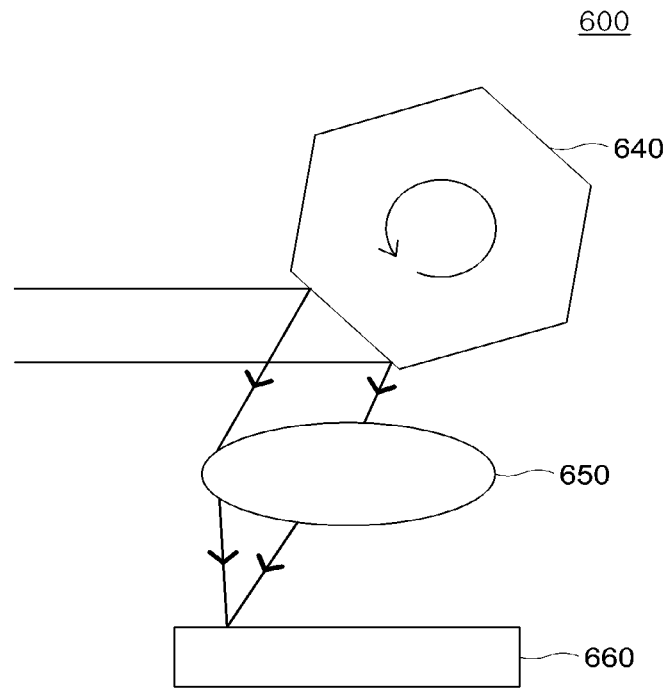
FIGS. 7 to 13 are diagrams for describing a method of operating a rotary mirror according to an embodiment of the present invention.
Figure 8:
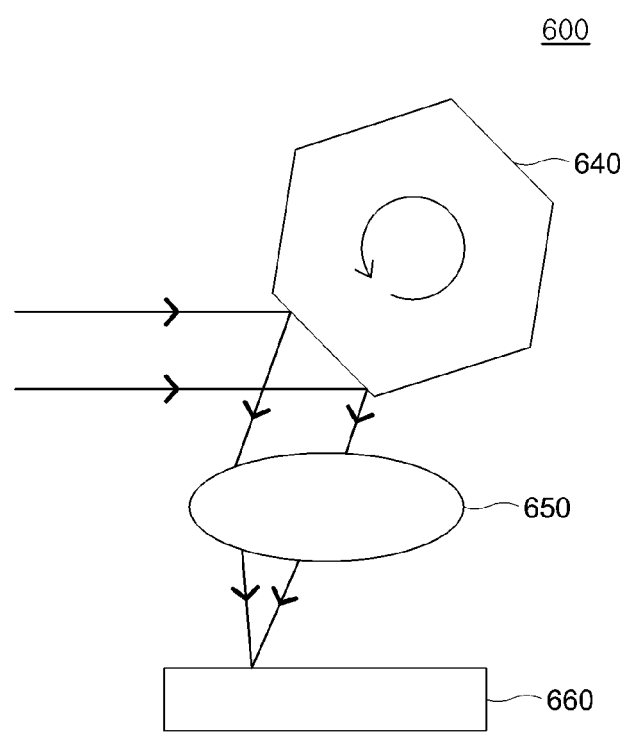
Figure 9:
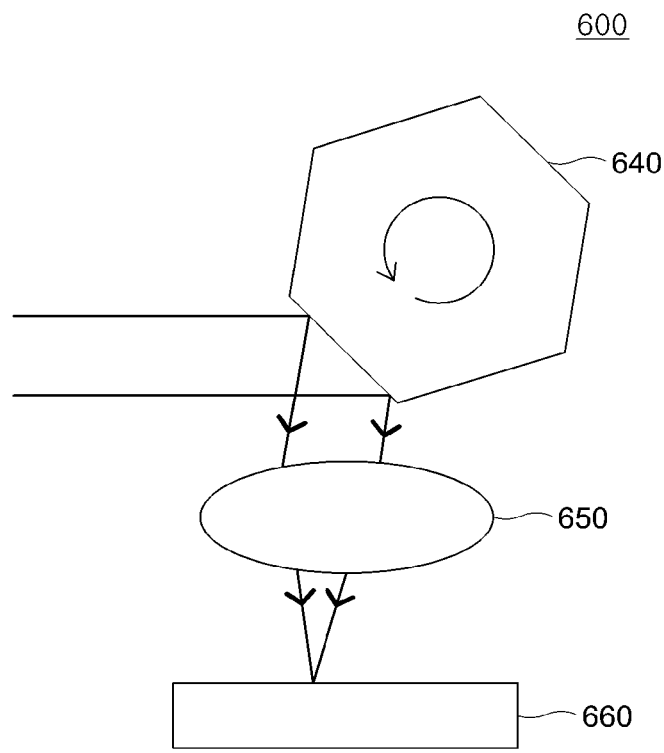
Figure 10:
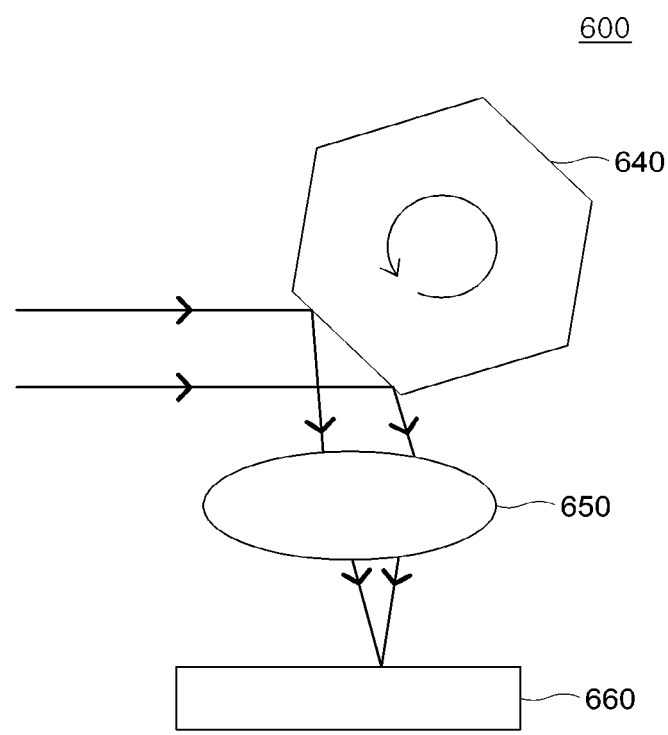
Figure 11:
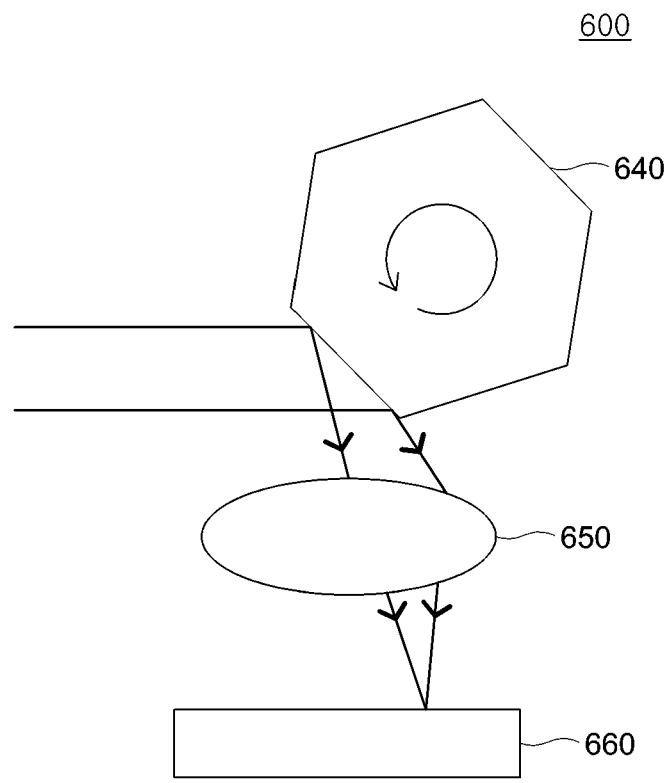
Figure 12:
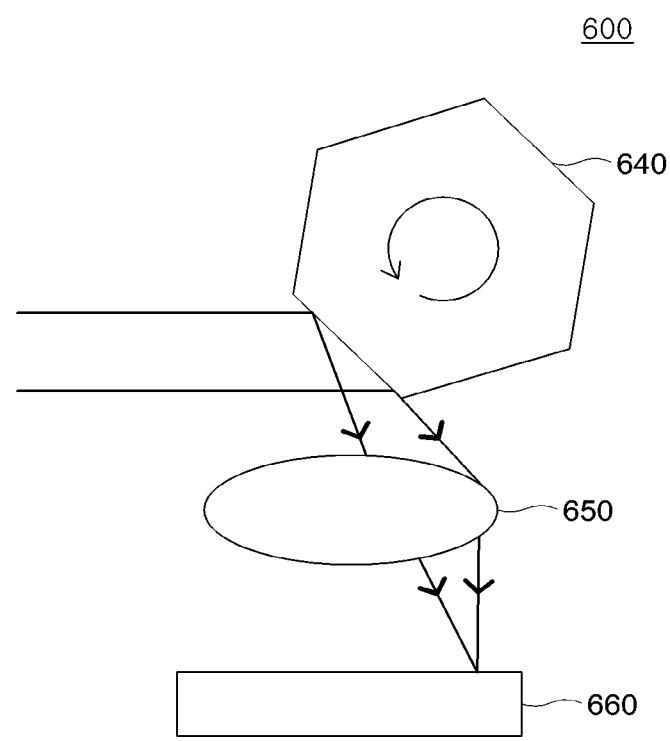

FIG. 6 is a diagram for specifically describing the ring beam forming portion of FIG. 5.

Referring to FIGS. 5 and 6, the ring beam forming portion 530 may include a first axicon mirror 532 and a second axicon mirror 531.

The first axicon mirror 532 may be disposed on a path of the terahertz wave incident from the terahertz wave generation portion 510.

The first axicon mirror 532 may form a ring beam by reflecting the terahertz wave incident from the terahertz wave generation portion 510 at an outer surface thereof.

The second axicon mirror 531 may be disposed between the terahertz wave generation portion 510 and the first axicon mirror 532. For example, the second axicon mirror 531 may have an inwardly inclined reflection surface.

The second axicon mirror 531 may have a first hole 533 so that the terahertz wave incident from the terahertz wave generation portion 510 passes and is incident on the first axicon mirror 532.

FIGS. 7 to 13 are diagrams for describing a method of operating a rotary mirror according to an embodiment of the present invention.

Referring to FIGS. 7 to 12, a rotary mirror 640 may be a polygon mirror having a plurality of reflection surfaces tilted at different angles, respectively, and rotating to change a path of the ring beam reflected by the plurality of reflection surfaces to form a first line beam on the inspection target object. In other words, in a case where the polygon mirror 640 has six reflection surfaces, angles at which the six reflection surfaces are tilted may be different from each other.

As illustrated in the drawings, as the polygon mirror 640 having six reflection surfaces tilted at different angles, respectively, rotates, the angles of the ring beam reflected from the first reflection surface to the sixth reflection surface may be changed (sequentially illustrated in FIGS. 7 to 12).

Figure 13:
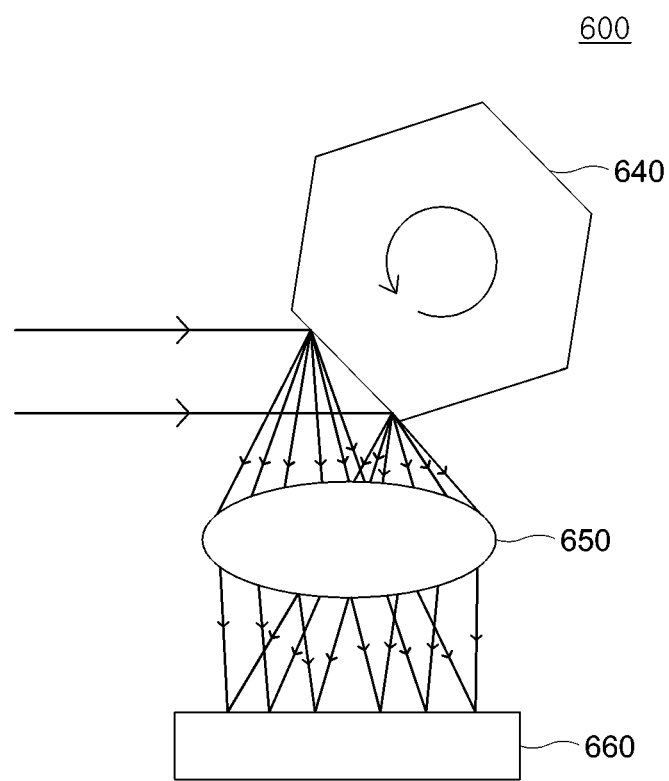

FIG. 13 illustrates all ring beams reflected from the six reflection surfaces, and it may be seen that the ring beam reflected by the polygon mirror 640 and collected by a lens 650 is focused on an inspection target object 660, in a form of line beam.

As such, the inspection apparatus for a high speed and a large area according to the present invention may form a line beam on the inspection target object 660 with in a short time, and thus the line scanning may be performed.

Figure 14:
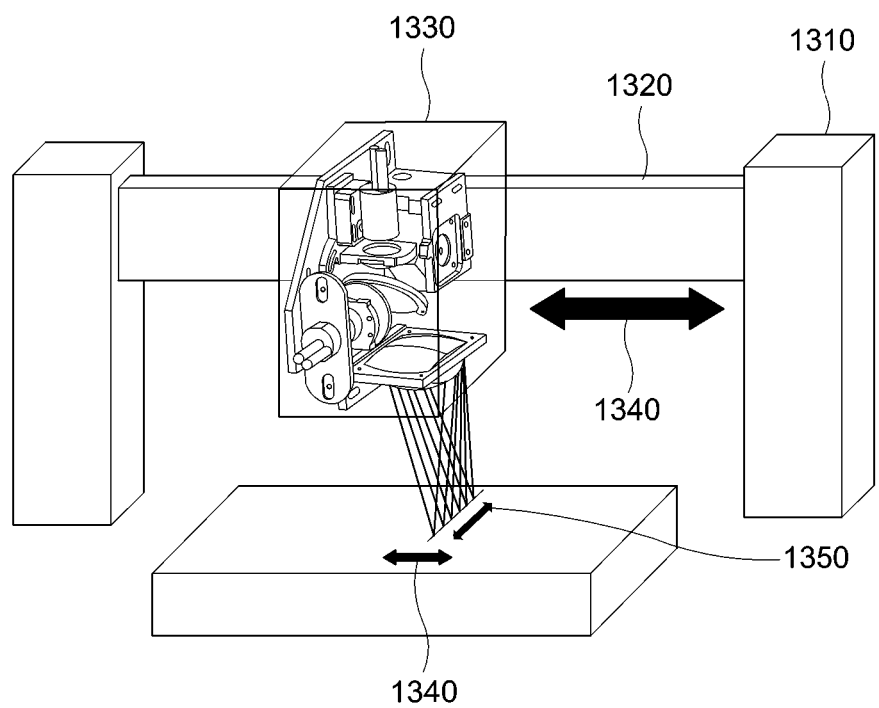
FIG. 14 is a diagram for specifically describing an inspection apparatus for a high speed and a large area according to an embodiment of the present invention.

FIG. 14 is a diagram for specifically describing an inspection apparatus for a high speed and a large area according to an embodiment of the present invention.

Referring to FIG. 14, an inspection apparatus for a high speed and a large area may include a fixing portion 1310, a first moving portion 1320, and an optical scan head 1330.

The fixing portion 1310 may be a mechanism structure to which the optical scan head 1330 and the first moving portion 1320 may be fixed.

The first moving portion 1320 may move a path of the optical scan head including a terahertz wave generation portion, a ring beam forming portion, a rotary mirror, and a detector. The first moving portion 1320 may allow a second line beam 1340 to be formed in a direction different from that of a first line beam 1350 formed on an inspection target object as the rotary mirror rotates.

As a result, the inspection apparatus 1330 for a high speed and a large area may form the first line beam 1350 and the second line beam 1340 at the same time to perform scanning, thereby scanning a large area at a high speed.

Figure 15:
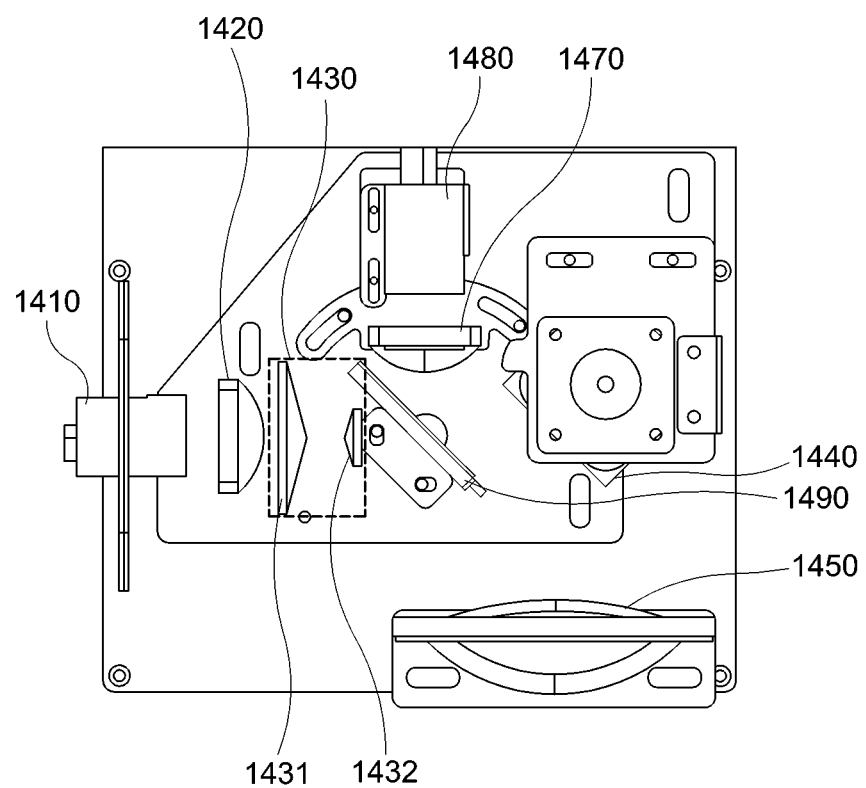
FIG. 15 is a diagram for specifically describing an optical scan head according to an embodiment of the present invention.

FIG. 15 is a diagram for specifically describing the optical scan head according to an embodiment of the present invention.

Referring to FIGS. 14 and 15, the optical scan head 1330 includes a terahertz wave generation portion 1410, an angle changing portion 1420, a ring beam forming portion 1430, a rotary mirror 1440, a second lens 1450, a third lens 1470, a detector 1480, and a path changing portion 1490.

Functions of the terahertz wave generation portion 1410, the angle changing portion 1420, the ring beam forming portion 1430, the rotary mirror 1440, the second lens 1450, the third lens 1470, the detector 1480, and the path changing portion 1490 have already been described, and thus a description thereof will be omitted.

As such, the terahertz wave generation portion 1410, the angle changing portion 1420, the ring beam forming portion 1430, the rotary mirror 1440, the second lens 1450, the third lens 1470, the detector 1480, and the path changing portion 1490 may be compactly arranged in the optical scan head 1330, and the optical scan head 1330 may be implemented as one module.

Figure 16:
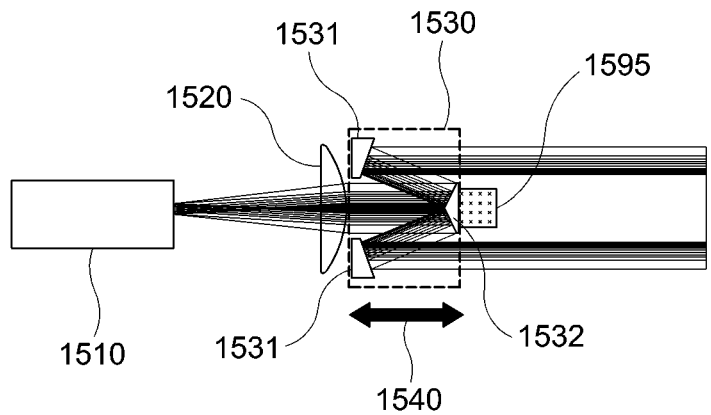
FIG. 16 is a diagram for describing a method of adjusting a diameter of a ring beam according to an embodiment of the present invention.

FIG. 16 is a diagram for describing a method of adjusting a diameter of a ring beam according to the embodiment of the present invention.

Referring to FIG. 16, the terahertz wave generation portion 1510 may generate terahertz waves.

The angle changing portion 1520 may decrease an angle of a terahertz wave incident from the terahertz wave generation portion 1510 to allow the terahertz wave to be incident on the ring beam forming portion 1530.

The ring beam forming portion 1530 may form a ring beam by using the incident terahertz wave.

The ring beam forming portion 1530 may include a first axicon mirror 1532 and a second axicon mirror 1531.

The first axicon mirror 1532 is disposed on the path of the terahertz wave incident from the terahertz wave generation portion 1510, and may be disposed between the second axicon mirror 1531 and the rotary mirror 1540.

The first axicon mirror 1532 may form a ring beam by reflecting the terahertz wave incident from the terahertz wave generation portion 1510 at an outer surface thereof.

The second axicon mirror 1531 may be disposed between the terahertz wave generation portion 1510 and the first axicon mirror 1532.

A second moving portion 1595 may be mechanically connected to the first axicon mirror 1532 and move the first axicon mirror 1532 to change a focal point.

Further, as the first axicon mirror 1532 is moved by the second moving portion 1595, an outer diameter D of the ring beam and an inner diameter d of the ring beam may be changed. When the outer diameter D of the ring beam and the inner diameter d of the ring beam are changed, an incident angle of the ring beam focused on the inspection target object may be changed.

As such, the inspection apparatus for a high speed and a large area according to the present invention inspects the object by adjusting the incident angle of the ring beam depending on a surface state of the inspection target object by using the second moving portion 1595, and thus the ring beam may be incident at an optimized incident angle depending on the surface state of the inspection target object at the time of the inspection, which is advantageous.

Figure 17:
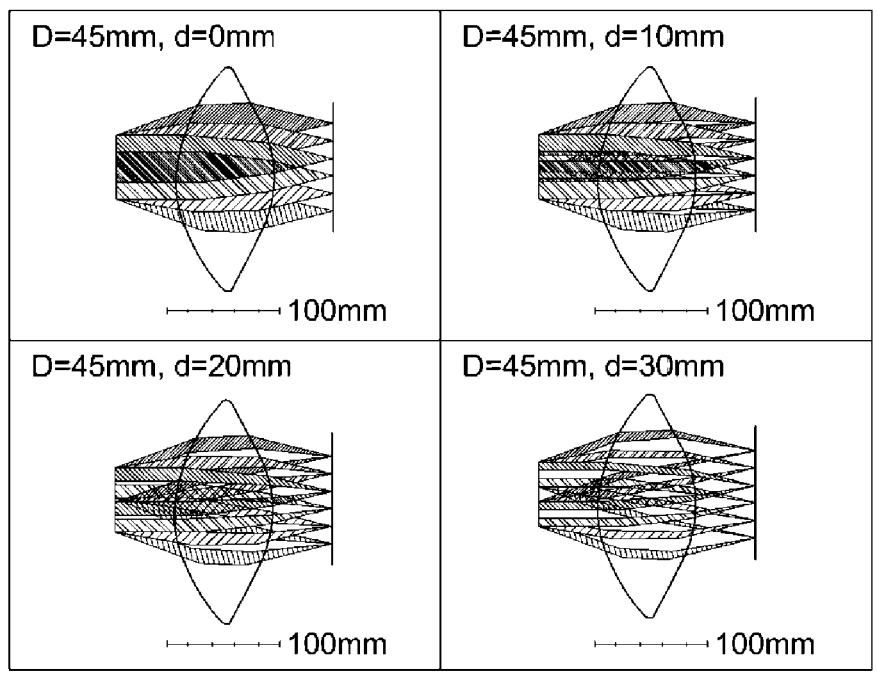
FIGS. 17 and 18 are diagrams for describing a resolution changed depending on a change of the diameter of the ring beam.
Figure 18:
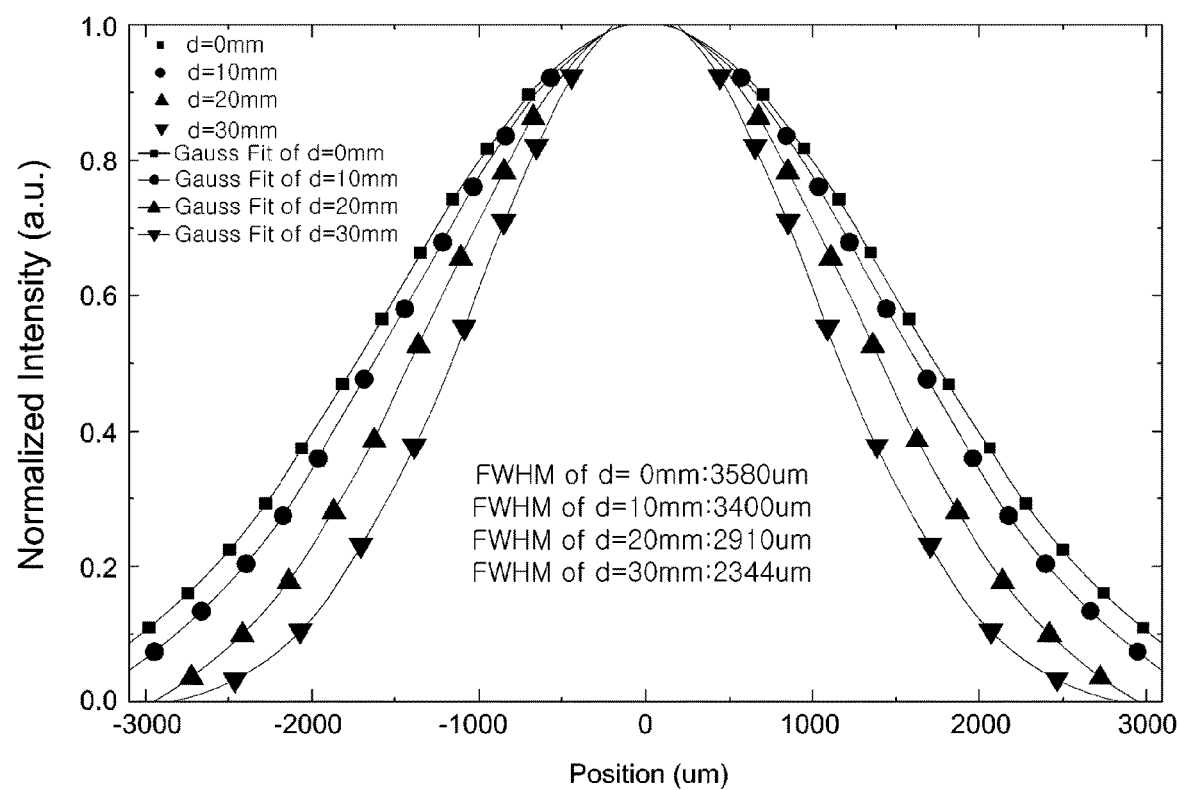

FIGS. 17 and 18 are diagrams for describing a resolution changed depending on a change of the diameter of the ring beam. FIG. 18 is a diagram illustrating a result of calculation performed by using a Zemax program according to the Huygens diffraction theory.

Referring to FIGS. 16 to 18, the inspection apparatus for a high speed and a large area may move the components of the ring beam forming portion by using the second moving portion to adjust the size of the ring beam. Referring to the drawings, it may be seen that a resolution is changed depending on the outer diameter D of the ring beam and the inner diameter d of the ring beam. It may be appreciated that the resolution is changed as the inner diameter d of the ring beam is changed to 0 mm, 10 mm, 20 mm, and 30 mm.

The inspection apparatus for a high speed and a large area according to the present invention may adjust the ring beam formed by the ring beam forming portion by using the second moving portion so that the resolution optimized for an inspection situation is obtained. Therefore, the inspection apparatus for a high speed and a large area may perform inspection optimized for each inspection situation.

The invention claimed is:

1. An inspection apparatus for a high speed and a large area, the high-speed device comprising:
    a terahertz wave generation portion configured to generate a terahertz wave;
    a ring beam forming portion configured to form a ring beam by using the terahertz wave incident from the terahertz wave generation portion;
    a rotary mirror configured to reflect the ring beam formed by the ring beam forming portion while rotating to allow the ring beam to be focused on an inspection target object;
    a detector configured to detect a ring beam generated from the inspection target object; and
    the ring beam forming portion includes:
        a first axicon mirror forming a ring beam by reflecting the terahertz wave incident from the terahertz wave generation portion; and
        a second axicon mirror reflecting the ring beam reflected from the first axicon mirror toward the rotary mirror.

2. The high-speed device of claim 1, wherein the ring beam forming portion includes:
    a first forming portion forming a terahertz Bessel beam by using the terahertz wave incident from the terahertz wave generation portion; and
    a second forming portion forming a ring beam by using the terahertz Bessel beam, and changing the ring beam so that the ring beam is incident on the rotary mirror while being parallel.

3. The high-speed device of claim 2, wherein the first forming portion is a first axicon lens having an apical angle at which a diameter of the formed terahertz Bessel beam is smaller than a wavelength of the terahertz wave generated by the terahertz wave generation portion.

4. The high-speed device of claim 3, wherein the second forming portion is a second axicon lens disposed so as to be symmetric to the first axicon lens.

5. The high-speed device of claim 4, wherein the second axicon lens has the same apical angle as the first axicon lens.

6. The high-speed device of claim 3, wherein the second forming portion is a first convex lens changing an angle of the terahertz Bessel beam incident from the first forming portion so that the terahertz Bessel beam is incident on the rotary mirror while being parallel.

7. The high-speed device of claim 1, wherein the first axicon mirror is disposed on a path of the terahertz wave incident from the terahertz wave generation portion.

8. The high-speed device of claim 1, wherein the second axicon mirror is disposed between the terahertz wave generation portion and the first axicon mirror, and has a first hole so that the terahertz wave incident from the terahertz wave generation portion passes and is incident on the first axicon mirror.

9. The high-speed device of claim 1, wherein the second axicon mirror has an inclined reflection surface corresponding to an outer surface of the first axicon mirror.

10. The high-speed device of claim 9, wherein the second axicon mirror has a reflection surface parallel to the outer surface of the first axicon mirror.

11. The high-speed device of claim 1, wherein a size of the second axicon mirror is larger than a size of the first axicon mirror.

12. The high-speed device of claim 1, wherein the rotary mirror is a polygon mirror having a plurality of reflection surfaces tilted at different angles, respectively, and rotating to change a path of the ring beam reflected by the plurality of reflection surfaces to form a first line beam on the inspection target object.

13. The high-speed device of claim 12, further comprising a first moving portion configured to move a path of an optical scan head including the terahertz wave generation portion, the ring beam forming portion, the rotary mirror, and the detector to form a second line beam on the inspection target object, in a direction different from that of the first line beam.

14. The high-speed device of claim 1, further comprising a second lens configured to allow the ring beam reflected by the rotary mirror to be incident on the inspection target object.

15. The high-speed device of claim 1, further comprising a third lens configured to collect the ring beam reflected or transmitted from the inspection target object.

16. The high-speed device of claim 1, further comprising an angle changing portion configured to decrease an angle of the terahertz wave incident from the terahertz wave generation portion to allow the terahertz wave to be incident on the ring beam forming portion.

17. The high-speed device of claim 1, further comprising a second moving portion mechanically connected to the first axicon mirror and configured to move the first axicon mirror to change a focal point.

18. An inspection apparatus for a high speed and a large area, the high-speed device comprising:
   a terahertz wave generation portion configured to generate a terahertz wave;
   a ring beam forming portion configured to form a ring beam by using the terahertz wave incident from the terahertz wave generation portion;
   a polygon mirror having a plurality of reflection surfaces tilted at different angles, respectively, and configured to rotate to change a path of the ring beam reflected by the plurality of reflection surfaces to form a first line beam on an inspection target object;
   a first moving portion mechanically coupled to the polygon mirror and configured to move the polygon mirror to change the path of the ring beam reflected by the plurality of reflection surfaces to form a second line beam on the inspection target object, in a direction different from that of the first line beam;
   a second lens configured to allow the ring beam reflected by the polygon mirror to be focused on the inspection target object;
   a path changing portion disposed between the ring beam forming portion and the polygon mirror and configured to change a path of a reflection ring beam reflected from the inspection target object, incident on the polygon mirror, and reflected and incident from the polygon mirror;
   a third lens disposed so as to be spaced apart from the path changing portion and configured to collect the reflection ring beam of which the path is changed by the path changing portion;
   a detector configured to detect the reflection ring beam collected by the third lens; and
   the ring beam forming portion includes:
      a first axicon mirror forming a ring beam by reflecting the terahertz wave incident from the terahertz wave generation portion; and
      a second axicon mirror reflecting the ring beam reflected from the first axicon mirror toward the rotary mirror.

* * * * *